United States Patent [19]
Phelps

[11] 3,766,583
[45] Oct. 23, 1973

[54] OFFSHORE LIQUEFIED GAS TERMINAL
[75] Inventor: Rex V. Phelps, Tulsa, Okla.
[73] Assignee: Gulf Oil Corporation, Pittsburgh, Pa.
[22] Filed: June 21, 1972
[21] Appl. No.: 264,830

Related U.S. Application Data
[63] Continuation-in-part of Ser. No. 51,812, July 2, 1970, abandoned.

[52] U.S. Cl. .................................. 9/8 P, 114/0.5 T
[51] Int. Cl. ........................................... B63b 35/44
[58] Field of Search ............................. 9/8 P, 8 R; 114/0.5 T, 74 A; 61/46.5

[56] References Cited
UNITED STATES PATENTS

| | | | |
|---|---|---|---|
| 3,213,632 | 10/1965 | Valk et al. ................. | 114/74 A X |
| 3,081,600 | 3/1963 | Davidon .................... | 61/46.5 |
| 3,072,087 | 1/1963 | Henry ........................ | 114/74 A |
| 3,076,205 | 2/1963 | Schultz ....................... | 9/8 P |
| 3,498,249 | 3/1970 | Jones ......................... | 114/74 A |

Primary Examiner—Milton Buchler
Assistant Examiner—Gregory W. O'Connor
Attorney—Meyer Neishloss et al.

[57] ABSTRACT

A portable terminal for liquefied natural gas in which a cryogenic storage tank for liquefied natural gas is mounted on a compartmented concrete base having sufficient buoyancy to float the tank and a gas treating plant is constructed on a deck forming the roof of the storage tank. The gas treating plant may be a plant for liquefying natural gas or a plant for gasification of stored natural gas. A barrier wall extending upwardly from the base near its outer edge is spaced from and surrounds the storage tank to form ballast compartments into which water can be pumped to sink the base of the terminal onto the ocean floor. Means are provided to circulate water through the base to prevent freezing of water below the storage tank.

14 Claims, 7 Drawing Figures

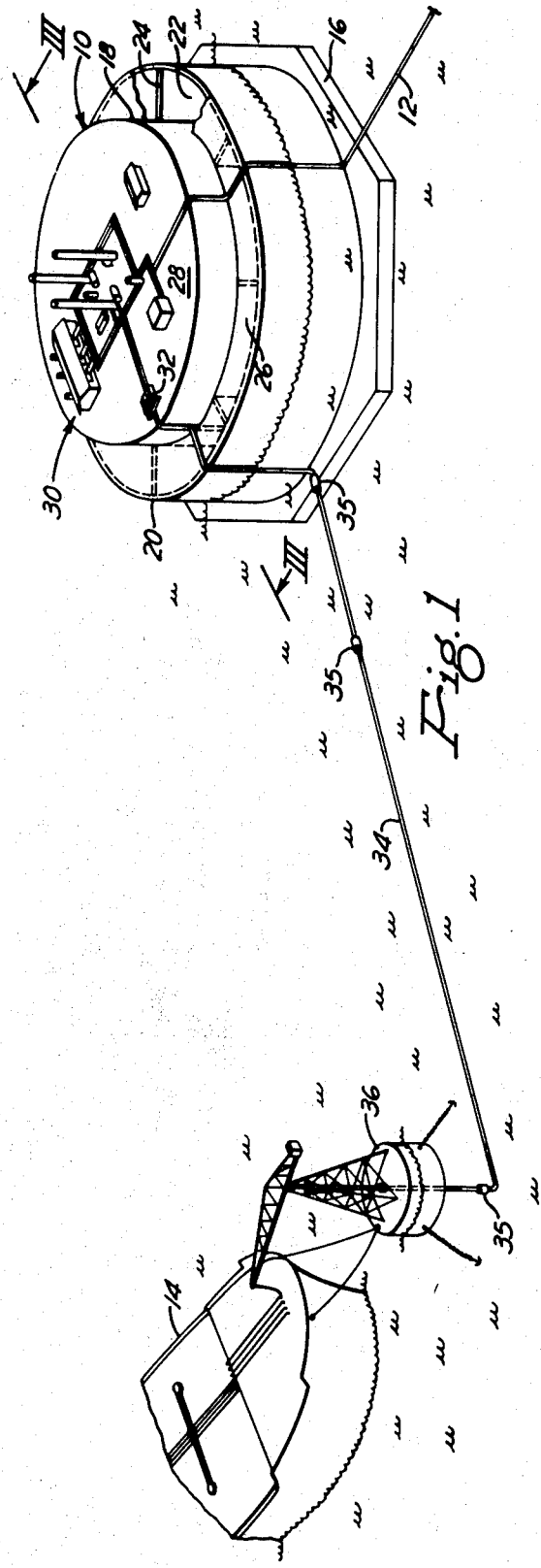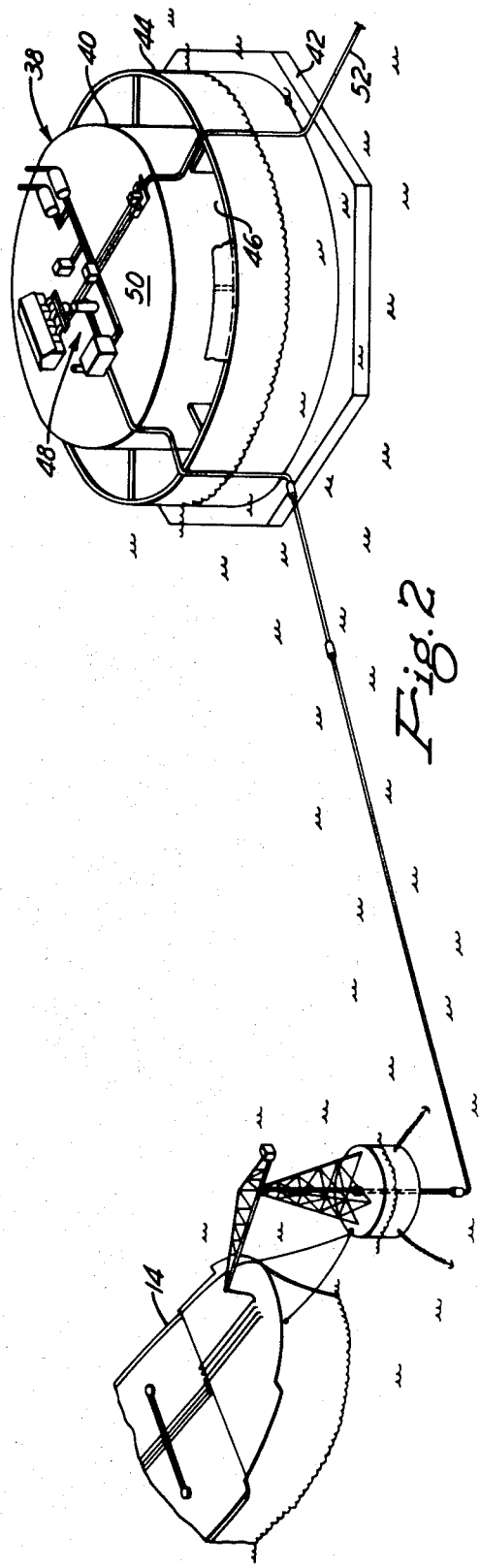

OFFSHORE LIQUEFIED GAS TERMINAL

This application is a continuation in part of my application Ser. No. 51,812 filed July 2, 1970, and entitled, upon amendment, Offshore Liquefied Gas Terminal now abandoned.

This invention relates to liquefied natural gas and more particularly to a storage system and apparatus enabling the economical transportation of natural gas from remote producing areas to domestic and industrial markets.

Because of its clean burning qualities and convenience, natural gas has become widely used both in industry and home heating during recent years. Coincident with the increase in demand for natural gas there have been important discoveries of gas in remote areas at great distances from potential markets. Many of the discoveries have been in fields situated offshore of marshes, swamps and other unfavorable and therefore costly or impossible construction sites for liquefaction plants and liquefied natural gas storage terminals. Such sites may be without natural harbors or channels and located where water depths suited to tankers, and especially supertankers, may be many miles out to sea.

Natural gas can be economically transported across land or even across small or shallow bodies of water through pipelines. When it is necessary to transport natural gas across the ocean for delivery to the market, a serious problem arises because of the low density of the natural gas. If the gas is transported in the gaseous state, large containers capable of withstanding high pressures would be necessary for the transportation of an economically feasible quantity of gas. In fact, it has become apparent that natural gas can be economically transported in ships only if the natural gas is liquefied. A few insulated tankers capable of transporting liquefied natural gas substantially at its boiling point have been constructed and a few more are planned. The small number of tankers available makes a large liquefied gas storage facility necessary to allow continued operation of liquefaction plants between loadings of tankers. Moreover, the now well-established cost/size relationship of crude oil transportation which led inevitably to the modern supertankers recommends the use of the largest possible liquefied natural gas tankers, which in turn demands very large storage terminal capacity.

Plants for the liquefaction of natural gas are expensive units that include heavy precision equipment and sophisticated instrumentation. The skilled workmen required for the construction of such plants are available only at great expense in many of the relatively undeveloped countries in which important gas discoveries have been made and the supplying of the necessary skilled labor to those countries becomes an important part of the cost of liquefaction plants. Plant and storage terminal construction costs under such adverse field conditions may reduce the profitability of the entire project below acceptable limits.

U.S. Pat. No. 3,161,492 of Keith et al. discloses a natural gas liquefaction plant mounted on an offshore platform. The entire platform is supported above the surface of water by telescoping legs which extend downwardly to the sea bottom. U.S. Pat. No. 2,472,869 of Travers describes a concrete island adapted to be moved to an offshore site and then sunk to provide a base for well drilling and storage of oil. U.S. Pat. No. 1,310,461 describes various types of floatable concrete structures for use in marine installations. U.S. Pat. No. 3,081,600 of Davidon describes a submergible barge for offshore operations. U.S. Pat. No. 3,213,632 of Valk et al. describes a vessel having insulated tanks for the transportation of LNG. U.S. Pat. Nos. 3,081,600 and 3,213,632 were cited as references in the parent application Ser. No. 51,812.

This invention resides in offshore terminals for receiving, liquefying, storing, vaporizing, or delivering natural gas that include a compartmented base having a storage tank suitable for storing liquefied natural gas mounted on its upper surface. The base has sufficient buoyancy to float the structure to a desired offshore location where the structure is sunk to be supported by the bottom. In a preferred embodiment the base extends laterally beyond the wall of the storage tank and supports a barrier wall surrounding and spaced from the storage tank. Bulkheads extending from the wall of the storage tank to the barrier wall divide the annular space between those walls into a plurality of ballast compartments provided with suitable means for varying the amount of water in these compartments to control the buoyancy of the terminal. The roof of the storage tank can serve as a foundation or base for a gas liquefaction or vaporization plant. The facility constructed is especially adaptable for very large storage tanks having a capacity of 500,000 to 2,500,000 or more barrels.

Referring to the drawings:

FIG. 1 is a diagrammatic perspective view of a terminal constructed in accordance with this invention for the liquefaction of natural gas and storage and delivery of the liquefied natural gas into a tanker.

FIG. 2 is a perspective view similar to FIG. 1 of a terminal for receiving liquefied natural gas from a tanker, storing the liquefied natural gas, and regasification and delivery of natural gas.

Figure 3:
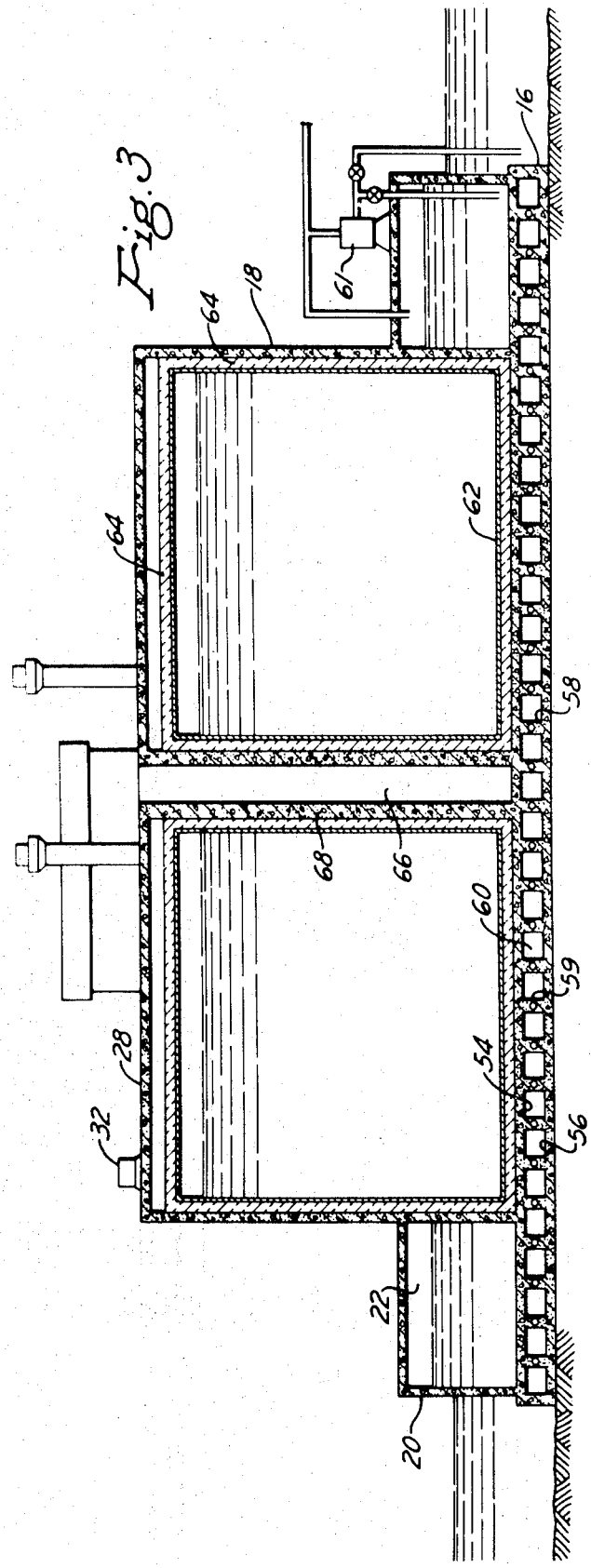
FIG. 3 is a vertical sectional view through the section line III—III in FIG. 1.
Figure 4:
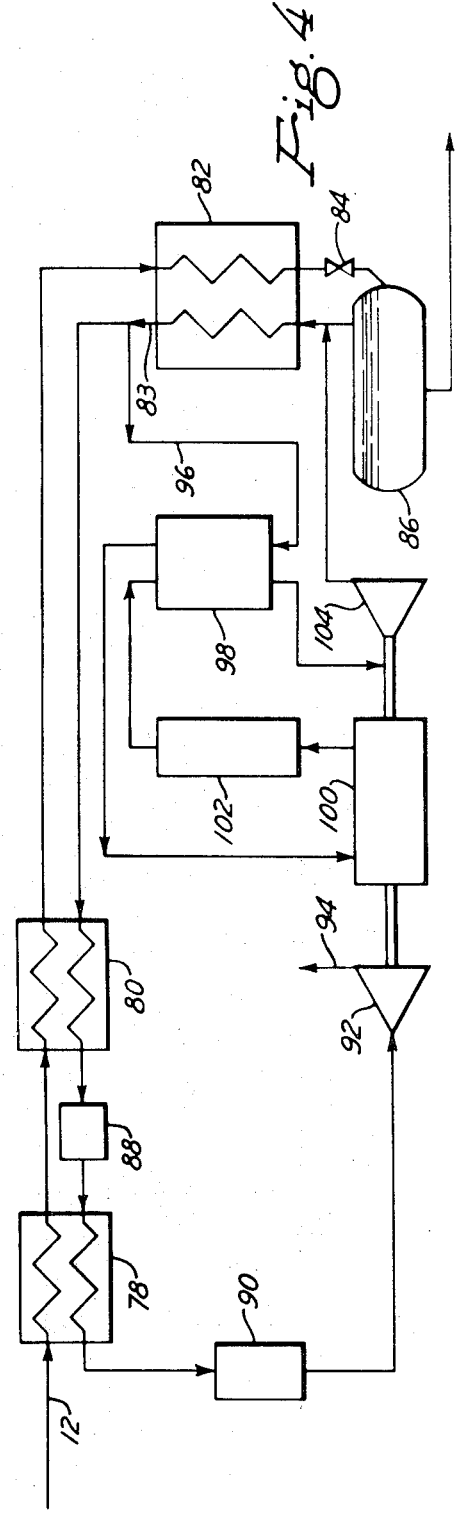
FIG. 4 is a flow sheet of a preferred plant for the liquefaction of natural gas to be used in this invention.

Referring to FIG. 1 of the drawings, a terminal facility indicated generally by reference numeral 10 is shown partially submerged at an offshore location for receiving natural gas through a supply line 12 and delivering the liquefied natural gas to a tanker 14. The terminal 10 includes a base 16 resting on the ocean floor at location. Base 16 has a substantially flat upper surface on which a storage tank 18, hereinafter described in greater detail, is mounted. A barrier wall 20 extending upwardly from base 16 surrounds and is spaced from the outer wall of the storage tank 18 to provide an annular space between the barrier wall 20 and the outer wall of storage tank 18 divided into ballast compartments 22 by a plurality of bulkheads 24 spaced at intervals around the periphery of tank 18. A deck 26 extends inwardly from the upper edge of the barrier wall 20 to the wall of storage tank 18 to cover the ballast compartments 22. In FIG. 1, a portion of deck 26 has been broken away to show one of bulkheads 24. The ballast compartments can be individually filled with, or emptied of, water to adjust the weight of the terminal facility 10 and maintain it level as it is sunk into position and thereafter.

Mounted on a deck 28 forming the top of the storage tank 18 is a liquefaction plant indicated generally by reference numeral 30 for liquefaction of natural gas delivered through line 12 to the terminal facility. Liquefaction plant 30 cools and condenses the natural gas and delivers the cold liquid product into the storage tank 18 at a temperature of approximately −258°F. Suitable loading pumps 32, shown in FIG. 1 mounted on the roof of storage tank 18, are provided to pump liquefied natural gas from the storage tank 18 through a loading line 34 and mooring facility 36 into a tanker 14. Loading line 34 is typically a 12 to 16 inch inside-diameter line so insulated as to prevent icing of the external jacket and vaporization of the liquefied natural gas passing through the line and into the tanker 14. Loading line 34 is provided with expansion joints 35 or other suitable means to allow the temperature of line 34 to vary from the ocean temperature to the temperature of the liquefied product without damage to the line from expansion and contraction. The invention is illustrated with the line 34 extending from storage tank 18 to a single-point mooring buoy 36, but this invention is not limited to that type of mooring facility. For example, a dock could be constructed near the facility 10, the tanker docked in the conventional manner, and a loading line run above the surface of the water to the dock.

Referring to FIG. 2 in which the tanker is shown at an unloading and regasification terminal indicated generally by reference numeral 38, a storage tank 40 similar to storage tank 18 is supported on a base 42 resting on a level portion of the ocean floor. Base 42, which is illustrated as having an octagonal shape in plan view, has a construction similar to base 16. A barrier wall 44 encircles storage tank 40 and provides annular buoyancy compartments 46 surrounding the storage tank. A regasification plant 48 is mounted on the roof 50 and may be of typical construction which includes equipment for pumping the liquefied natural gas from tank 40, converting the liquefied natural gas to the gaseous state with heat provided by gas-fired heaters or by means of heat exchange with air, brine, sea water or other suitable media, and delivering it to the shore through delivery line 52.

Referring to FIG. 3 of the drawings, base 16 is shown having an upper member 54 supported above a floor 56 by vertical walls 58. Vertical walls at right angles to walls 58 and similarly spaced combine with walls 58 to divide the base 16 into a plurality of cells 60 which make the base 16 buoyant and provide insulation between the bottom of the tank 18 and the ocean floor. Upper member 54, floor 56, and walls 58 are preferably constructed of concrete of sufficient thickness and suitably reinforced to support the weight of the storage tank 18 and its contents, liquid in the ballast compartments 22, and the liquefaction plant 30. Pipes 59 are provided in walls 58 for circulation of a heating fluid, air, or other suitable heat transfer media to prevent freezing below base 16. It may be more desirable to introduce heat into these walls by electrical resistance heating cables embedded in these vertical members. Because the bottom of tank 18 is thoroughly insulated, the amount of heat that must be supplied to base member 16 is small.

The barrier wall 20 extends upwardly from the upper surface of the upper member 54 for a height adequate to provide sufficient buoyancy to allow the facility 10 to be floated from the place of manufacture to the place of use. As shown in the drawings, barrier 20 extends upwardly above the surface of the water when base 42 rests on the ocean floor. Barrier wall 20 combines with the outer wall of storage tank 18 to form the ballast compartment 22 which must have a capacity large enough to sink the terminal onto the ocean floor even though the storage tank 18 is empty. Because the buoyancy of the terminal is determined by the weight of water displaced which depends upon the depth of the water at the site of the terminal, the necessary height of wall 20 and spacing from the tank will depend on the depth of water at the site of the terminal. Means such as a ballast pump 61 which may be elsewhere situated and suitable piping are provided to allow pumping water from the ocean into the ballast compartments 22 or from the ballast compartments into the ocean.

Storage tank 18 is of a construction suitable for storage of liquid products at extremely low temperatures. Although this invention is not limited to a specific storage tank structure, a suitable structure is provided by a tank having a liner 62 of 9 percent nickel steel, aluminum, concrete, plastic or other suitable material surrounded at its sides, top, and bottom by insulation 64 such as perlite. The insulation is in the space between the liner 62 and the outer wall of the tank 18 and between liner 62 and the upper surface of upper member 54 of base 16. Depending on the material selected in a typical structure, the thickness of insulation 64 may be approximately 3 feet. Deck 28 is supported a suitable height, for example 5 feet, above the upper surface of the insulation by suitable means. Columns supported by the upper member 54 and extending upwardly through tank 18 can be used to support the deck 28. In the embodiment illustrated in FIG. 3, a cylindrical shaft 66 extends downwardly through the tank 18 at its center. Shaft 66 is enclosed by a large column of annular cross section constructed of concrete and forming wall 68. In a typical installation the opening in shaft 66 is 15 feet in diameter and the wall 68 has a thickness of 5 feet. Suitable beams, not shown in the drawings, extend from wall 68 to the outer wall of tank 18 to support the deck 28.

The base 16 of the terminal facility 10 is constructed in a dry dock. At any time after completion of the base, the dry dock can be filled with water to float the base, and the storage tank and gas liquefaction plant can be constructed on the base either at the dry dock or while the base is floating at some other suitable location. It is an advantage of this invention that the storage tank and the gas liquefaction plant or the gas vaporization plant can be constructed at a location having completely equipped shop facilities and skilled craftsmen. It is only necessary to make simple connections at the final terminal location which may be a remote location where skilled craftsmen are not readily available. After completion of construction, the terminal facility is towed to the desired location and water pumped into the ballast compartments to sink the facility onto the chosen site.

Figure 6:
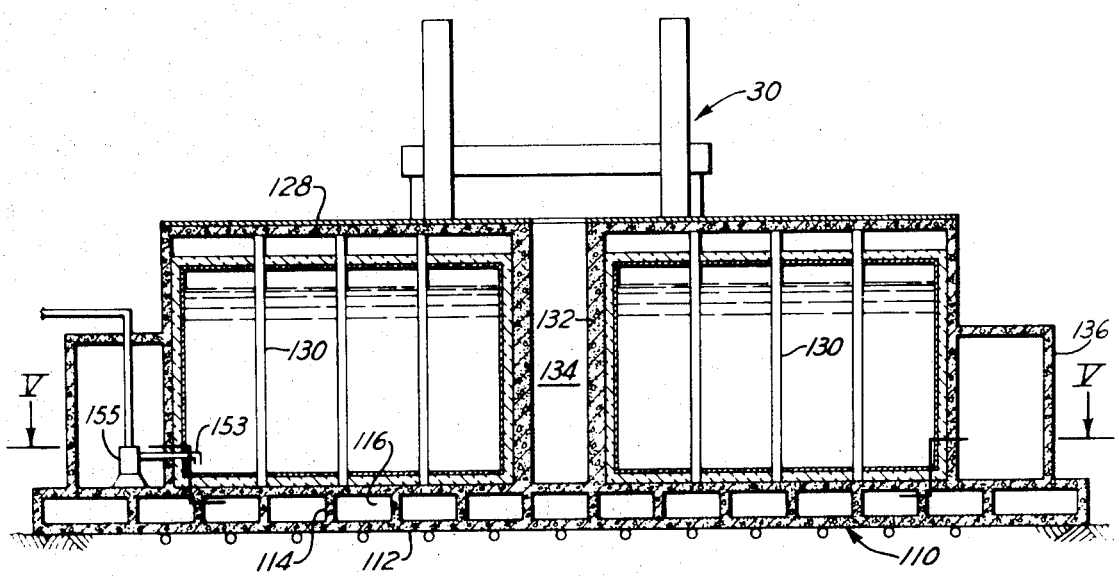
FIG. 6 is a diagrammatic vertical sectional view along section line VI—VI in FIG. 5 of the embodiment illustrated in FIG. 5.

The flow sheet of a gas liquefaction plant that can be used in this invention is diagrammatically illustrated in FIG. 6. In a typical operation, natural gas from the gas supply line 12 is delivered at a pressure of about 600 p.s.i.a. into a gas purifier 78 in which water, carbon dioxide, and heavy hydrocarbons are removed from the gas. The gas passes from gas purifier 78 to a cooler 80 in which the temperature of the gas is reduced to about 40°F. The cooled gas then passes through a heat exchanger and liquefier 82 in which the gas is condensed to a liquid at a pressure of approximately 600 p.s.i.a. Condensed gas from heat exchanger and liquefier 82 is expanded through an expansion valve 84 in which the pressure drops to about 20 p.s.i.a. and the temperature to −260°F. The liquefied natural gas discharged from expansion valve 84 flows into a gas-liquid separator drum 86. Liquefied natural gas from the bottom of the separating drum 86 is delivered into the storage tank 18.

Vapors from the gas-liquid separator drum 86 flow through the heat exchanger liquefier 82 to cool the natural gas stream flowing through that unit. Part of the vapors discharged from heat exchanger and liquefier 82 through line 83 at a temperature of about 10°F. flow through cooler 80 countercurrent to the natural gas stream to cool that stream before it enters the heat exchanger liquefier. The vapors from heat exchanger 80 are recompressed in compressor 88, pass through the purifier 78 to regenerate the purification system and then into a preheater 90 and through a gas turbine 92 to generate power used in the process. Gas discharged from the gas turbine through line 94 is suitable for use as a fuel.

The remainder of the vapors discharged through line 83 from the heat exchanger and liquefier 82 are withdrawn through a line 96 and pass through a precooler 98. Those vapors then flow through a multistage compressor 100 with suitable cooling between stages. The compressed vapors are cooled in a heat exchanger 102 to about 95°F. and are further cooled to about 15°F. in precooler 98 by heat exchange with the gas from line 96 before delivery to a turboexpander 104. The vapors are expanded in turboexpander 104 to a pressure of about 20 psi and are cooled by the expansion to a temperature of about −200°F. before mixing with the vapors withdrawn from gas-liquid separating drum 86. While a specific liquefaction flow sheet has been described, this invention is not limited to that flow sheet. Conventional liquefaction plants such as the using the process illustrated by cascade-type plant can be used.

Figure 7:
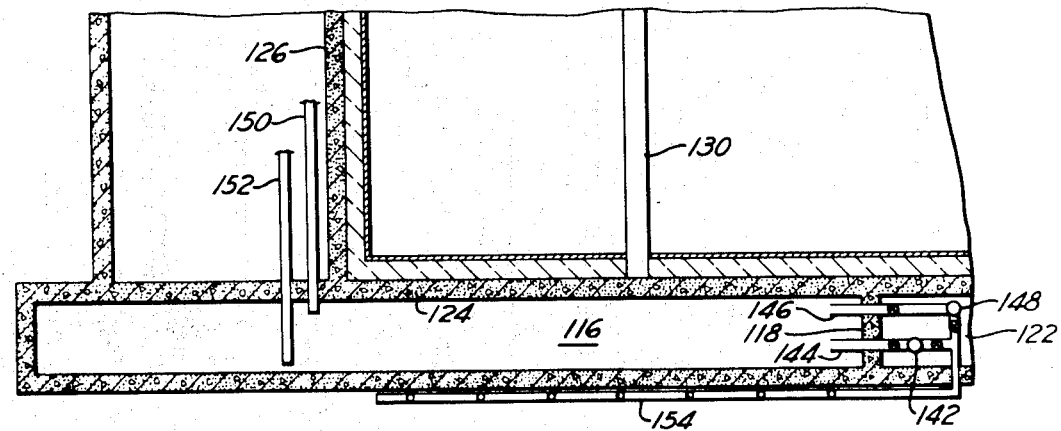
FIG. 7 is a vertical sectional view along section line VII—VII in FIG. 5 showing the pipe arrangement for controlling the amount of water in the buoyancy compartments and circulating water through the compartments.

It may be desirable to deliver water into the cellular spaces between the floor and ceiling of the base for adjustment of the buoyancy of the structure for floating the structure to the desired site, sinking it on location, increasing the stability of the structure, adjustment of the net weight of the structure and compensating for changes in the volume of liquefied natural gas in the storage tank. A suitable embodiment of this invention permitting such filling is illustrated in FIGS. 5, 6, and 7.

Referring to FIG. 6, the base indicated generally by reference numeral 110 is shown having a floor 112 adapted to rest on the ocean floor. A plurality of walls 114 extend upwardly from the base 112 to divide the base into a series of buoyancy compartments 116 which can be selectively filled or drained of water.

Figure 5:
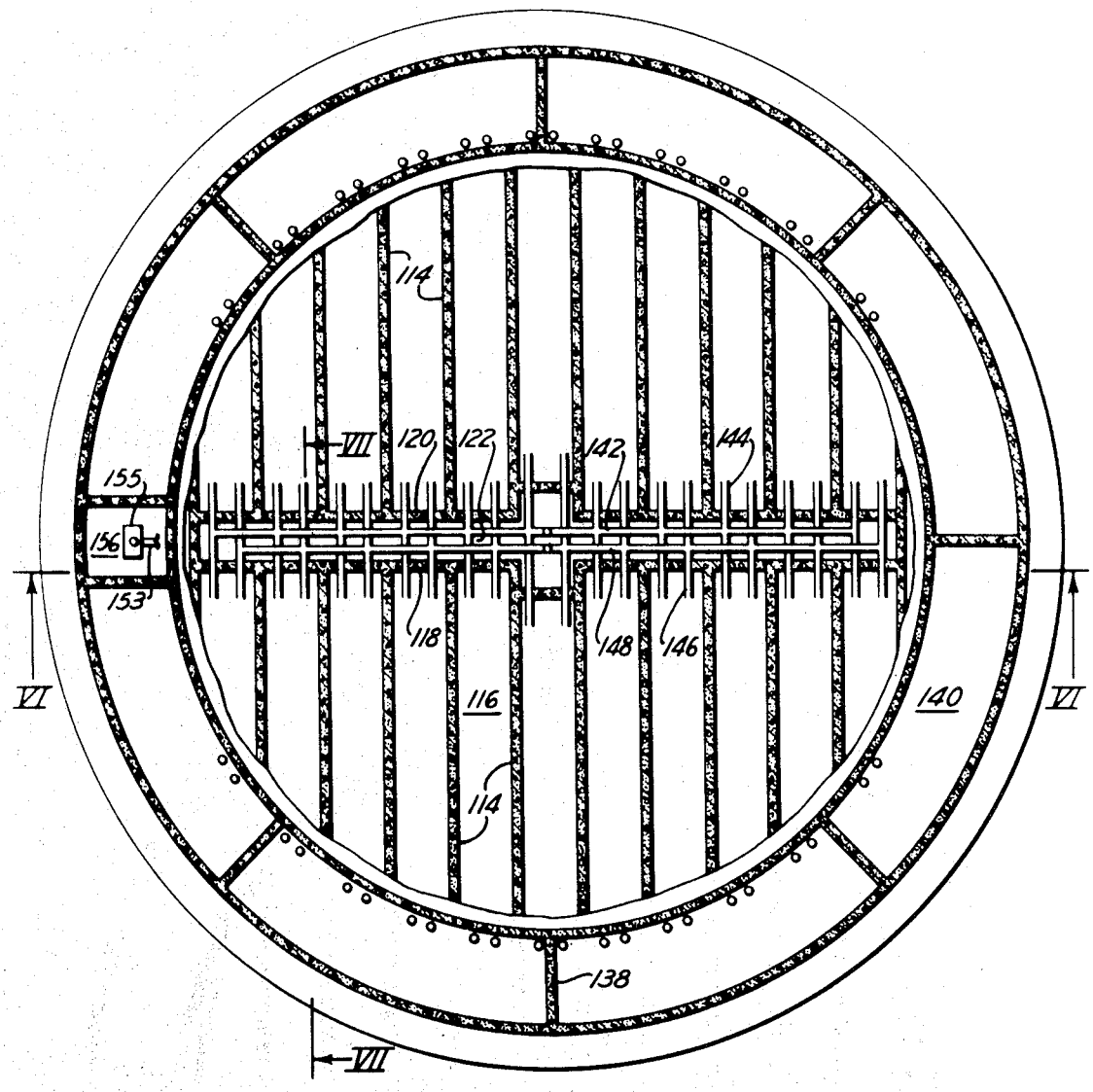
FIG. 5 is a diagrammatic horizontal sectional view along section line V—V in FIG. 6 of an embodiment of this invention having provisions for circulation of liquid through buoyancy compartments in the base of the terminal facility.

As best illustrated in FIG. 5, the walls 114 extend across the base from opposite sides of the base where they intersect end walls 118 and 120. End walls 118 and 120 are spaced apart to provide an access passage 122 permitting access to each of compartments 116. Suitable closures, not shown in the drawings, are provided in the end walls 118 and 120 to allow entry into the buoyancy compartments 116 between the walls 114.

It is preferred that the base 112, the walls 114, and the upper member 124 of the base be constructed of precast and reinforced concrete. They are of sufficient thickness to support the weight of the storage tank 126, its contents, and liquefaction plant 30 as well as the weight of the base. The deck 128 of storage tank 126 illustrated in FIG. 6 is supported by columns 130 in tank 126, the wall 132 of access shaft 134 and the outer wall of the storage tank. For example, in a tank of approximately 2,000,000 barrels capacity, the base 110 may have a diameter of approximately 470 feet, a concrete floor 112 24 inches thick and upper member 124 18 inches thick. The height of the buoyancy compartments 116 can be approximately 15 to 20 feet.

The amount of water in the buoyancy compartments 116 is adjusted to control the buoyancy of the terminal and allow it to be floated through shallow water from the graving dock at which it is constructed and then sunk at the desired location in a level attitude on the ocean floor. At some locations it may be necessary to maintain some buoyancy in the base when the storage tank is filled to avoid overloading the soil on which the facility rests and to maintain a permanently level posture. In some areas the sea bottom may not be capable of supporting a structure of sufficient weight to have satisfactory lateral stability. It will then be necessary to provide a prepared ocean-bottom foundation such as piling, anchored concrete filled caisson type structures, or a bottom of coarse sand. Since the weight of the facility will depend on how much liquefied natural gas is in the storage tank 126, the amount of water in the buoyancy compartments can be changed from one time to another to control the net weight of the structure. Further control of the net weight of the structure is obtained by water in the space between a barricade or barrier wall 136 and the storage tank 126 divided by bulkheads 138 into a number of ballast compartments 140. Removal of water from the ballast compartments and the buoyancy compartments will allow the terminal facility to be refloated if it is desirable to move the facility to another location.

Referring to FIGS. 5 and 7, a compressed air supply line 142 extends the length of the access tunnel 122. Air lines 144, suitably valved, extend from the compressed air supply line 142 into each of the buoyancy compartments 116. Similarly, a suitably valved water inlet line 146 extends into each of the compartments 116 from a water header 148 in access tunnel 122. Two outlet lines extend from the end of each buoyancy compartment 116 opposite the access tunnel 122 for the withdrawal of fluid from the buoyancy compartments. One outlet line 150 opens into the buoyancy compartment 116 a short distance below the upper member 124 of the buoyancy compartment, and the other outlet line 152 opens a short distance above the floor of buoyancy compartments 116. Lines 150 and 152 extend upwardly to the deck 128 above the storage tank where they have valves permitting control of flow through the lines.

If it is desired to remove the water from compartment 116, air is introduced through line 144 and water withdrawn through line 152 until the desired amount of water is in the buoyancy compartment. If the compartment is partially filled with water and it is desired to increase the amount of water within the compartment 116, the compartment is filled through line 146 and air allowed to escape through line 150 until the water level is increased to the desired height in the buoyancy compartment.

Because of the very low temperature of the liquefied natural gas, circulation of water through buoyancy compartments 116 is maintained to avoid ice formation. Circulation is maintained by stopping the flow of air, introducing water through line 146, and withdrawing water through line 150, if compartments 116 are full, or line 152. A pump suction line 153 opening into storage tank 126 just above the floor of the tank is connected to a pump 155 in a chamber 156 partitioned from the ballast compartments between barrier wall 136 and storage tank 126 for delivery of liquefied natural gas from the storage tank. While means have been shown for positive circulation of water through the buoyancy compartments 116, circulation adequate to prevent freezing of water in the compartments 116 can be obtained at locations at which there is an appreciable water current by extending the compartments 116 all of the way across the base, properly orienting the base as it rests on the bottom, and providing controlled openings in the outer wall of the buoyancy compartments. To facilitate release of the facility from the bottom of the ocean if it should be desirable to refloat the facility for removal to another location, release lines 154 extend from the water header 148 and air line 142 downwardly through the floor of the base and along the under surface thereof. Lines 154 have openings along their length for the discharge of water underneath the base.

The liquefied natural gas terminal facility of this invention can be constructed at a manufacturing plant that is fully equipped to permit construction of the liquefaction or gasification plant at minimum cost and where highly skilled mechanics required for the construction of such plants are regularly available in order to maximize construction efficiency and effective cost control, and to minimize the total project cost. The facility can then be floated to the desired location and lowered into position. Only simple connection to the delivery and production lines is necessary at that location. It is apparent that this invention permits changing locations in order to optimize operating efficiency by enabling moves to maintain the best relationship to the gas supply as fields develop and gathering lines lengthen to reach field extensions.

This invention provides an extremely large storage capability which enables continuous operation of the liquefaction and gasification plants even though deliveries to or from tankers are made infrequently and, even more importantly, can be sized to accommodate the largest supertankers. The possibility of ice formation resulting from the very large temperature difference between the liquefied natural gas and water used as a ballast is overcome in this invention by providing means for circulation of any suitable heat exchanging media such as air or water to supply the necessary amount of heat into the base structural members.

The ballast and buoyancy compartments permit control of the weight of the facility to avoid overloading the soil on which it rests and also allow adjustment of the net weight of the facility as the amount of liquid in the storage tank is changed and to maintain the level attitude essential to safe, efficient and effective plant installation and operation. The control of the net weight of the facility is advantageous even when an ocean-bottom supported foundation has been prepared because the foundation requirements can be reduced by reducing the net weight of the structure.

The unique structure of the base with the barrier wall spaced from the storage tank to form ballast chambers permits storage tanks of very large capacity to be constructed at a convenient location and floated to the desired location and sunk, even when the storage tank is empty, for support from the bottom. By making the barrier wall to a height such that it will be above the surface of the water when the facility is supported by the bottom, ocean re-floating of the facility is possible by merely pumping water from the ballast chambers.

I claim:

1. An offshore terminal for liquefied natural gas adapted to be floated to the desired offshore site and sunk onto an ocean floor foundation comprising a flat concrete base having a height such that the upper surface of the base is below the surface of the water when the terminal is resting on the ocean floor foundation, a vertical cylindrical cryogenic storage tank for the storage of liquefied natural gas mounted on the upper surface of the base, said storage tank including a concrete outer shell encasing a liner and extending upwardly above the water surface when the terminal is on the ocean floor foundation, a barrier wall extending upwardly from the base to above the water level when the terminal rests on the ocean floor foundation and surrounding and spaced from the storage tank to provide a ballast compartment between the wall and storage tank having a volume such that the terminal can be sunk onto the ocean floor foundation when the storage tank is empty by introduction of water into the ballast compartments, means for delivering water into and withdrawing water from the ballast compartment to permit floating or sinking of the terminal, and a liquefied natural gas plant mounted on top of the storage tank for changing the phase of natural gas delivered to or from the terminal.

2. An offshore terminal as set forth in claim 1 in which the liquefied natural gas plant is a liquefaction plant.

3. An offshore terminal as set forth in claim 1 in which the liquefied natural gas plant is a vaporization plant.

4. An offshore terminal as set forth in claim 1 including means for circulating a heating medium through the base to prevent formation of ice below the storage tank.

5. An offshore terminal as set forth in claim 1 in which the base includes a horizontal bottom member, a horizontal upper member spaced above the bottom member, vertical walls joined to the bottom member and upper member dividing the base into buoyancy compartments, and means for introducing water into and withdrawing water from the buoyancy compartments to control the gross weight of the terminal.

6. An offshore terminal as set forth in claim 1 including means for supplying heat to the base to prevent formation of ice thereunder.

7. In an offshore terminal as set forth in claim 1, means for adjusting the gross weight of the terminal including a plurality of buoyancy compartments in the base, means for delivering air into each of the buoyancy compartments, means for delivering water into each of the buoyancy compartments, a first vent line opening into each of the buoyancy compartments near the bottom thereof, a second vent line opening into each of the buoyancy compartments near the top thereof, and means for controlling flow through the vent lines.

8. An offshore terminal as set forth in claim 1 in which the base includes a bottom member, a top member spaced above the bottom member, vertical walls extending from the bottom member to the top member, and means embedded in the vertical walls for supplying heat to the vertical walls.

9. A terminal as set forth in claim 1 including a vertical access shaft extending downwardly through the storage tank into the base, a horizontal access passage communicating with the access shaft and extending across the tank, a plurality of buoyancy compartments in the base member, and means permitting access from the access passage into the buoyancy compartments.

10. An offshore terminal as set forth in claim 1 including bulkheads extending from the barrier wall to the storage tank at intervals around the periphery of the storage tank to form a plurality of ballast compartments, and means for selectively introducing water into or withdrawing water from the ballast compartments.

11. An offshore facility for liquefied natural gas adapted to be floated to the desired site and partially submerged to be supported by an ocean floor foundation comprising a prestressed concrete base having a bottom member and a top member spaced therefrom, vertical walls including an outer wall between the bottom member and top member supporting the top member and dividing the base into a plurality of buoyancy compartments, means for introducing water into and withdrawing water from buoyancy compartments to control the buoyancy of the facility as it is floated to the desired location and to sink the facility at the desired location, controlled passages through the outer wall of buoyancy compartments opening into sea water surrounding the facility to permit flow of sea water through buoyancy compartments to supply heat thereto, a vertical cylindrical cryogenic storage tank mounted on the top member of the base and having its top above the level of waves when the facility is supported by the ocean floor foundation, said storage tank including a liner surrounded by insulation and concrete encasing the insulation, and a liquefied natural gas plant mounted on the top of the storag tank for changing the phase of natural gas delivered to or from the facility.

12. An offshore facility as set forth in claim 11 in which the liquefied natural gas plant is a plant for the liquefaction of natural gas.

13. An offshore facility as set forth in claim 11 in which the liquefied natural gas plant is a plant for the vaporization of liquefied natural gas.

14. An offshore facility for liquefied natural gas adapted to be floated to an offshore site and sunk at the site onto an ocean-bottom foundation comprising a concrete base having a flat floor and a flat upper member spaced therefrom, vertical walls extending from the floor to the upper member supporting the upper member above the floor and dividing the base into a plurality of buoyancy compartments; the longitudinal and lateral dimensions of the base being substantially equal; a cryogenic storage tank mounted on the upper member of the base and having its top above the surface of the water when the facility is supported by the ocean bottom foundation; said cryogenic storage tank comprising a liner, insulation surrounding the liner, and a concrete tank surrounding the insulation, the mass of the offshore facility and the volume of the buoyancy compartments in the base allowing flotation of the facility to the desired site and sinking at the site onto the ocean bottom foundation when the cryogenic storage tank is empty by delivery of water into the buoyancy compartments, means for adjusting the volume of water into the buoyancy compartments, and means for circulating water from outside the facility through the buoyancy compartments to prevent freezing of water in the buoyancy compartments.

* * * * *